United States Patent [19]

Harrison

[11] Patent Number: 5,588,352

[45] Date of Patent: Dec. 31, 1996

[54] APPLIANCE FOR MAKING YEAST DOUGHS AND COOKING BAGELS

[75] Inventor: Robert G. Harrison, Seattle, Wash.

[73] Assignee: PMI International Corporation, Seattle, Wash.

[21] Appl. No.: 452,509

[22] Filed: May 30, 1995

Related U.S. Application Data

[63] Continuation-in-part of Ser. No. 372,518, Jan. 13, 1995, Pat. No. 5,526,734.

[51] Int. Cl.$^6$ .............................. A47J 37/12; A23B 4/03
[52] U.S. Cl. .................. 99/339; 99/340; 99/348; 99/407; 99/412; 99/476
[58] Field of Search .................. 99/339, 340, 348, 99/357, 403, 405, 407, 409, 410, 412, 415, 476, 477; 219/400; 126/21 A

[56] References Cited

U.S. PATENT DOCUMENTS

| | | | |
|---|---|---|---|
| 3,463,077 | 8/1969 | Lescure | 99/403 |
| 3,801,331 | 4/1974 | Sano et al. | 99/403 |
| 5,429,039 | 7/1995 | Chang | 99/403 X |
| 5,445,061 | 8/1995 | Barradas | 99/348 X |

*Primary Examiner*—David Scherbel
*Assistant Examiner*—Reginald L. Alexander
*Attorney, Agent, or Firm*—Hughes, Multer & Schacht, P.S.

[57] ABSTRACT

An appliance which includes a casing divided into one zone in which uncooked bagels can be boiled and a second zone for subsequently baking the boiled bagels. The same appliance can also be used to make bagel doughs and other yeast doughs. In the dough making mode, a bagel rack and its support are removed from the casing and replaced with a dough container and a dough mixing and kneading blade.

18 Claims, 8 Drawing Sheets

APPLIANCE FOR MAKING YEAST DOUGHS AND COOKING BAGELS

RELATION TO ANOTHER APPLICATION

The present application is a continuation-in-part of application Ser. No. 08/372,518 filed 13 Jan. 1995 now U.S. Pat. No. 5,526,734.

TECHNICAL FIELD OF THE INVENTION

In one aspect the present invention relates to novel, improved, dual function appliances.

In a more specific aspect the invention relates to appliances as characterized in the preceding paragraph which can be used to: (1) cook bagels by a sequence of boiling and baking steps, and (2) mix the bagel dough and other yeast doughs.

BACKGROUND OF THE APPLICATION

Bagels are ring-shaped rolls with a tough, chewy texture. They are prepared by first boiling and then baking a kneaded and proofed yeast dough.

Bagels have become a universal food; and automated, commercial scale machines for cooking them in large quantities are in widespread use. However, comparable bagel cooking devices suitable for home use are not available. Instead, the cook has to boil the bagels in a pan of water, remove and drain the boiled bagels, transfer the drained bagels to a baking sheet, and then bake the bagels.

Parent application No. 08/372,518 discloses novel devices which are scaled for home and other low volume applications and which greatly simplify the task of boiling and then baking the proofed and shaped bagel dough. Generally speaking, these appliances combine an electrically heated boiler with a convection oven into a single unit. A displaceable rack allows the uncooked bagels to be shifted into the boiler to boil them and to then be transferred into the oven section of the unit to complete the cooking process. A control unit operates the boiling and baking sections of the unit for appropriate user-selectable periods of time and warns the user when each of the two cooking steps is completed.

SUMMARY OF THE INVENTION

Now invented and disclosed herein are certain new and novel appliances which: (a) have all of the functions and advantages of those disclosed in the parent application, and (b) are so designed that the bagel dough can be made and cooked in the same unit.

Generally speaking, the novel appliances of the present invention differ from those disclosed in the parent application in that they have: (1) a removable container in which dough is mixed, (2) an also removable blade for mixing and kneading the dough, and (3) a drive system for rotating the mixing/kneading blade. After the dough has risen, the dough container is removed from the unit. The dough is taken out of the container, punched down, set aside to rise for a second time, formed into rings, and returned to the unit for cooking by the sequence of boiling and baking steps.

The objects, features, and advantages of the present invention will be apparent to the reader from the foregoing and the appended claims and as the ensuing detailed description and discussion proceeds in conjunction with the accompanying drawings.

DETAILED DESCRIPTION OF THE INVENTION

Figure 6:
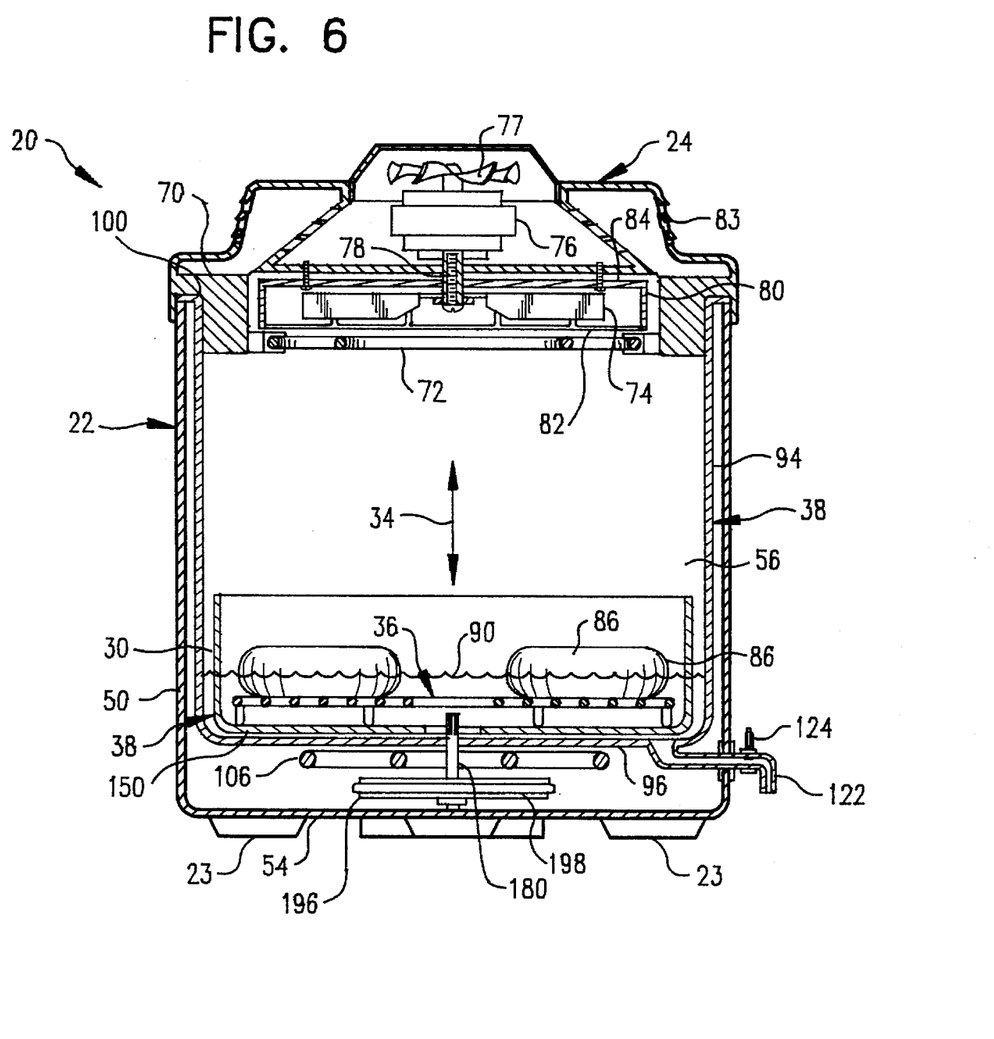
FIG. 6 is a view like FIGS. 4 and 5 but with the appliance being used for the first, boiling step of cooking bagels.
Figure 7:
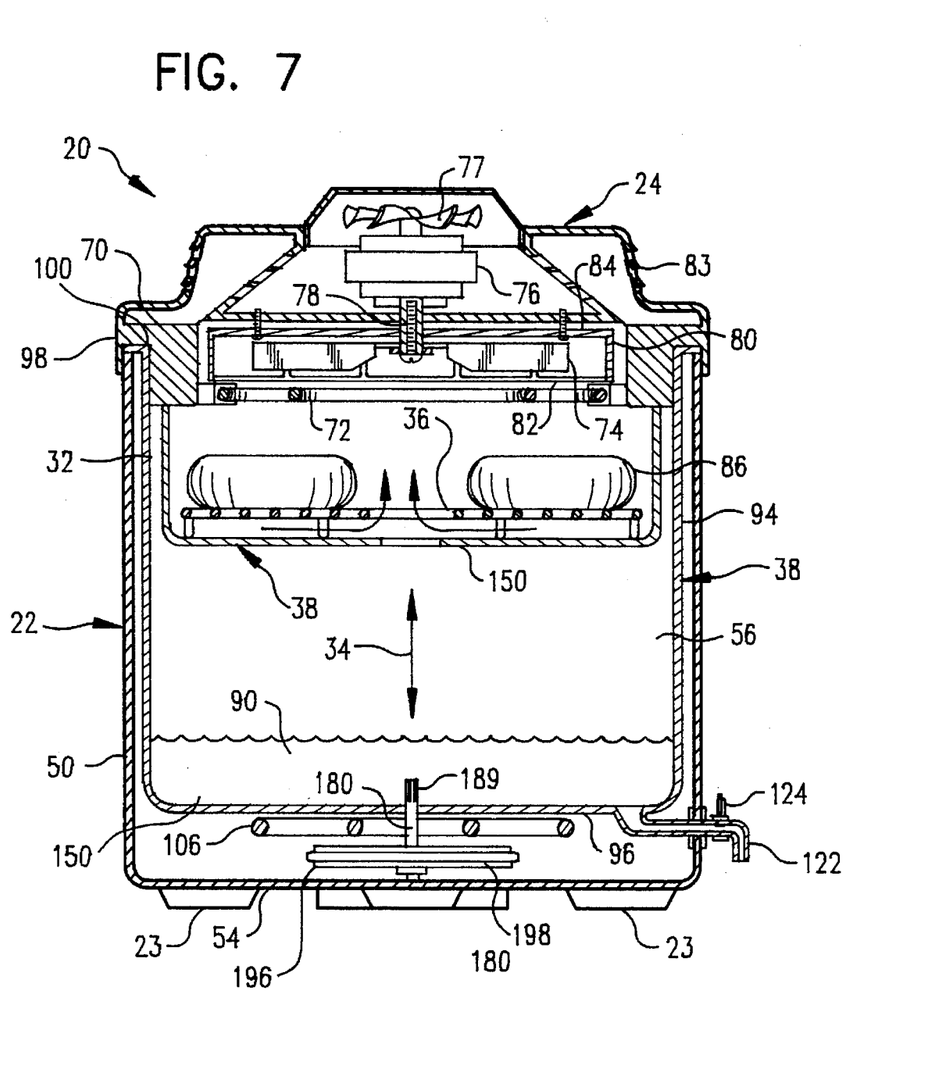
FIG. 7 is a view like FIGS. 4–6 but with a movable bagel support rack elevated to bake the boiled bagels in a convection oven section of the appliance.
Figure 8:
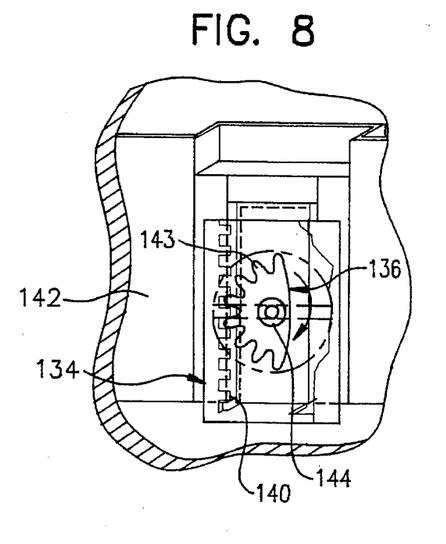
FIGS. 8 and 9 are fragmentary views of the appliance showing rack and pinion components of a unit which allows the user to shift the bagel support rack between boiler and oven sections of the appliance.

The drawings (FIGS. 1–7) depict a dough making and bagel cooking appliance 20 constructed in accord with, and embodying, the principles of the present invention. Appliance 20 includes a casing 22 with appliance-supporting feet 23 and a hinged cover 24. Housed in casing 22 and supported from the upper rim 26 of that casing is an imperforate inner casing 28 with a lower zone 30 in which uncooked bagels are boiled (see FIG. 6) and an upper zone 32 in which the boiled bagels are subsequently baked (see FIG. 7). Supported in casing 28 for bidirectional, vertical movement as suggested by arrow 34 in FIGS. 6 and 7 is a rack 36 on which the raw bagels are placed and a rack support 38 which can be displaced in the arrow 34 directions by the cam (rack and pinion) mechanism 40 depicted in FIGS. 8 and 9.

Also housed in casing 20 are a removable container 42 in which bagel and other yeast doughs can be mixed, kneaded, and proofed and an also removable blade 44 for mixing and kneading the dough. Blade 44 is rotated by an electrical drive system identified in FIGS. 4–7 by reference character 46.

Figure 10:
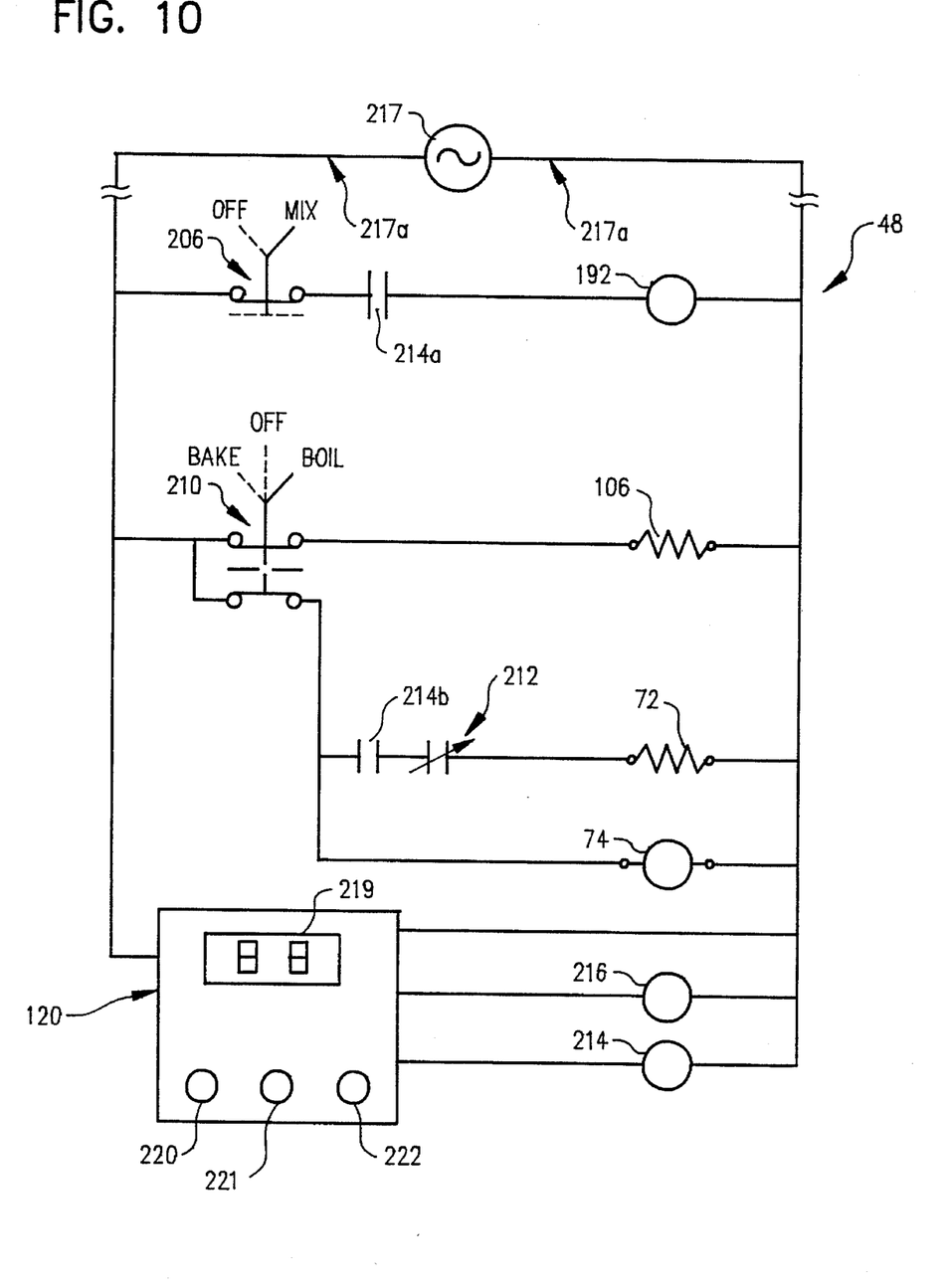
FIG. 10 is a schematic circuit diagram of the unit's electrical components.

The operation of appliance 20 is controlled by the system depicted in FIG. 10 and identified by reference character 48.

Referring still to FIGS. 1–7, the outer housing or casing 22 of appliance 20 has a vertically oriented, cylindrical side wall 52 and a flat bottom wall 54. Side wall 52 and bottom wall 54 are preferably insulated to isolate a user from the high temperatures reached in the interior 56 of the appliance during the operation of that device.

The cover or lid 24 of appliance 20 is a flat, circular, also preferably insulated component with a depending, integral flange 57 which fits around the periphery of outer casing side wall 52 adjacent the upper edge 26 of the casing. Lid 24 keeps hot gases and vapors from escaping the interior 56 of appliance 20 and possibly injuring the user. However, cover 24 is not clamped to casing 22 to avoid a potentially dangerous buildup of pressure in the bagel cooker interior.

Figure 1:
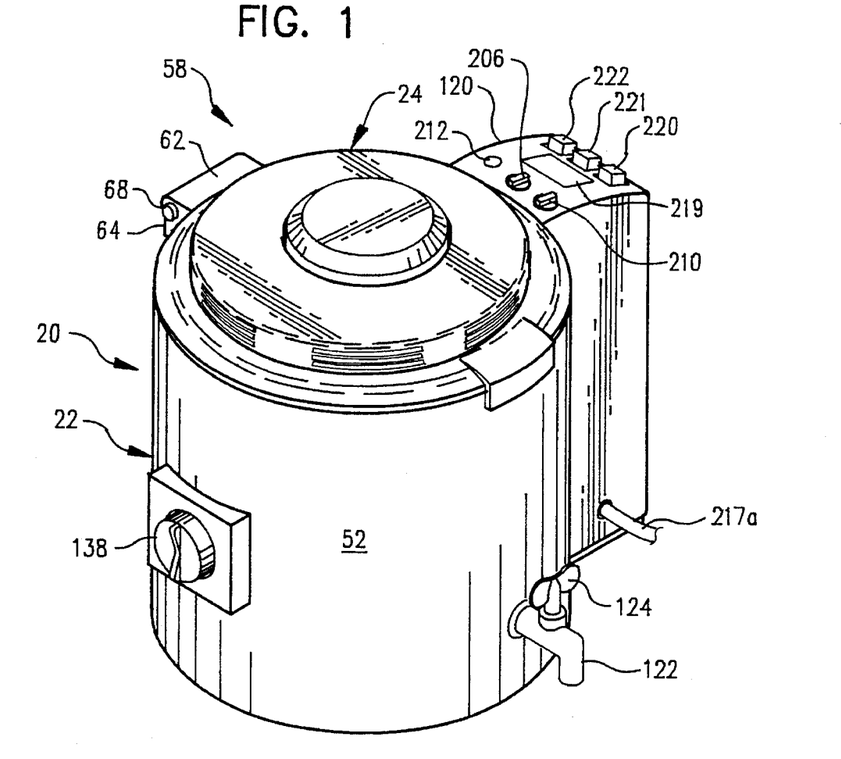
FIG. 1 is an external view of a dough making and cooking appliance embodying the principles of the present invention.
Figure 2:
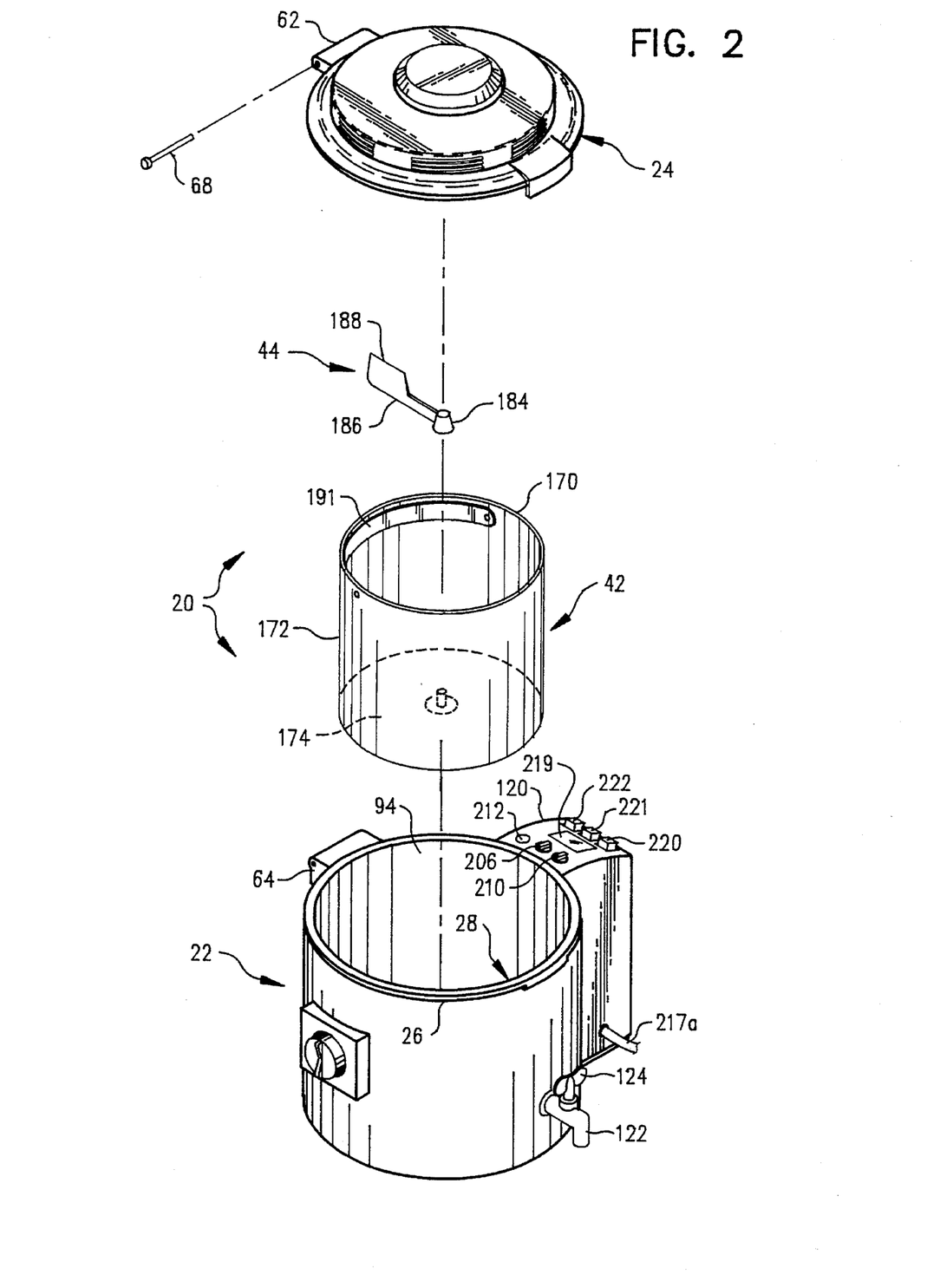
FIG. 2 is an exploded view of the appliance as configured for making dough.
Figure 3:
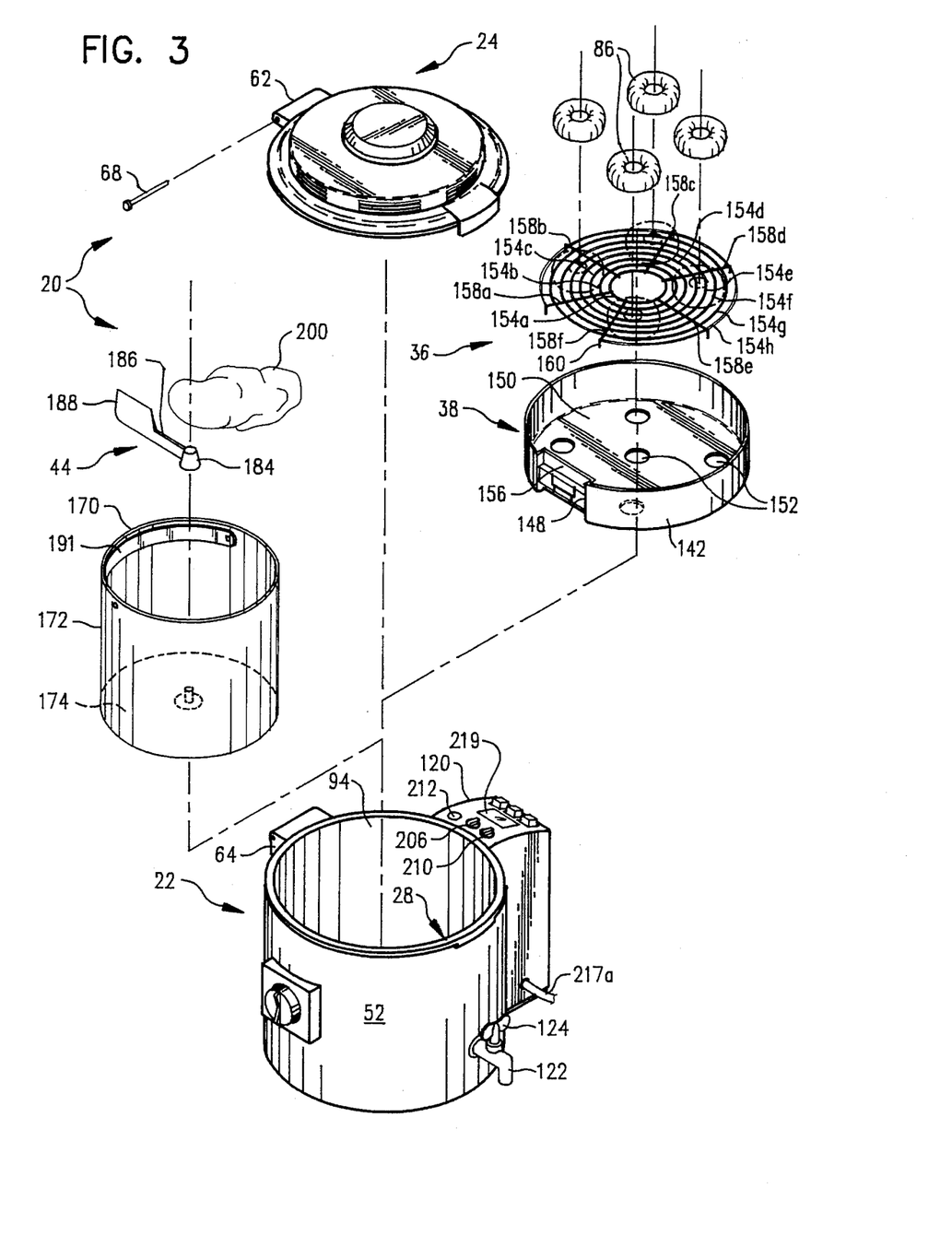
FIG. 3 is a second exploded view showing how the appliance is reconfigured for cooking bagels.

As shown in FIGS. 1–3, a hinge 58 supports cover 24 from outer casing side wall 52 for pivotable movement between closed and open positions. Hinge 58 includes one leaf 62 fixed to the peripheral flange 57 of cover 24 and a second, complementary leaf 64 mounted to the side wall 52 of outer casing 22. The two hinge leafs 62 and 64 are connected by a conventional pivot pin 68. Hinge 58 will also typically include an overcenter mechanism (not shown) for retaining cover 24 in the open position.

The cover 24 of bagel cooker 20 supports a removable cover 70 for inner casing 28 and a convection heating unit which includes heating coil 72, convection fan 74, fan motor 76, and motor cooling fan 77. Convection fan 74 is assembled to the lower end of the vertically extending fan motor output shaft 78, and motor cooling fan 77 is fixed to the upper end of the motor output shaft. The convection fan is surrounded by a protective shroud 80 with an open lower end 82 which allows fan 74 to circulate air inducted into casing 22 through louvered inlet 83 into the upper, oven zone 32 of the appliance interior 56.

Heating element 72 is typically a conventional resistance heater configured to surround the shaft 78 of fan motor 76. Heater 72 is assembled in any convenient manner to inner casing cover 70 between and in spaced relationship to cover 70 and the top 84 of fan shroud 80. This allows air to be circulated first over heater 72 to increase its temperature, then downwardly past fan shroud 80, and then up through bagel-supporting rack 36 to bake the bagels 86. The circulation pattern is depicted by the arrows collectively identified by reference character 88 in FIG. 7.

Before the bagels 86 are baked, however, they are first boiled as is conventional in cooking bagels. This step is carried out in the lower, boiling zone 30 of appliance 20 in a body 90 of boiling water contained in appliance inner casing 28. That component of the appliance has an open top, panlike configuration defined by a cylindrical side wall 94 and a flat, integral, circular bottom wall 96.

Appliance inner casing 28 is supported from outer casing 22 by an integral, outwardly directed, circumferentially extending flange 98 attached to and located at the upper end 100 of inner casing side wall 94. With the cover 24 of bagel cooker 20 closed, flange 98 rests on the upper end 26 of outer casing side wall 52. This forms a primary seal to isolate the user from hot gases and vapors generated in the interior of appliance 20 during the operation of that device.

Referring now to FIGS. 4–7, the water 90 in appliance inner casing 28 is boiled by a resistance heater 106 which is installed in outer casing 22 subjacent the bottom wall 96 of the inner casing. Heater 106 operates on electrical energy supplied through a line 114 extending from the heater into a cavity 116 in appliance outer casing 22 and upwardly through cavity 116 to a top mounted control box (not shown) which houses appliance control system 48 and has an externally accessible control panel 120.

Gases generated by the boiling of the water 90 in appliance inner pan 28 have the potential of causing a potentially dangerous buildup of pressure in the interior 56 of the appliance. This buildup of pressure can be avoided by employing a vent system (not shown) of the character disclosed in parent application Ser. No. 08/372,518.

After appliance 20 has been used for cooking bagels, the water 90 is drained from inner casing 28 through a line 122 extending from the bottom wall 96 of the inner casing to the exterior of outer casing 22. An otherwise closed valve 124 in drain line 22 is opened to drain the water.

Referring now to FIGS. 1 and 4–9, the cam mechanism 40 provided in appliance 20 to move bagel-supporting rack 36 in the arrow 34 directions between boiling zone 30 and baking or oven zone 32 includes an elongated rack 134, a pinion 136, and an external operator or knob 138. Rack 134 has the customary teeth 140. Cam mechanism rack 134 is attached in a vertical orientation and in any convenient manner to the side wall 142 of the support 38 for bagel rack 36.

Figure 9:
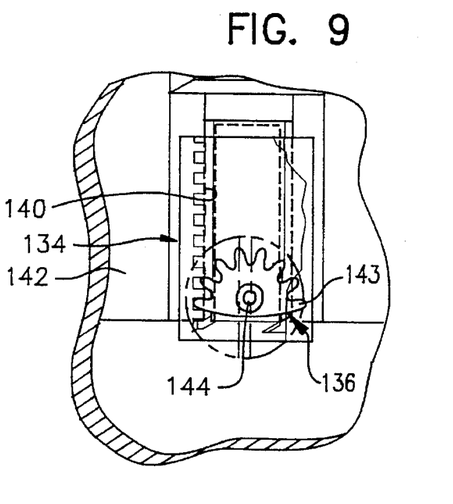

Pinion 136 has teeth 143 which mesh with the teeth 140 on rack 134. Pinion 136 is attached to the inner end of a shaft 144 which extends through the side wall 94 of appliance inner casing 28 and the side wall 52 of outer casing 24 and is rotatably supported in side wall 52. Knob 138 is fixed to the outer end of shaft 144 for rotation with the shaft. Consequently, rotation of knob 138 in the counterclockwise direction (as shown in FIGS. 9 and 10) will move cam mechanism rack 134, bagel rack support 38, and bagel rack 36 downwardly in appliance inner casing 28 toward and to boiler zone 30. Conversely, rotation of external knob 138 in the opposite, clockwise direction will move the cam mechanism rack, bagel rack support, and bagel rack upwardly into the oven zone 32 in the appliance. Friction or a detent arrangement between knob 138 and outer casing side wall 52 (not shown) can be employed to retain the bagel rack support, the bagel rack, and the bagels 86 being baked in the oven zone 32 of appliance 20.

The details of the bagel rack and its support thus raised and lowered by cam mechanism 40 are not critical. In the exemplary, illustrated embodiment of the invention, the rack support 38 is an open topped, sheet metal component with an indentation 148 in its side wall 142. That indentation accommodates the rack component 134 of cam mechanism 40 (see FIGS. 9 and 10). The bagel rack support also has a flat bottom wall 150 with a set of openings 152 through which water heated by resistance element 106 can circulate to boil the bagels 86 being cooked.

Bagel rack 36 is a flat array of concentric rings or rods 154a–154h with the outer ring 154h being interrupted to accommodate that segment 156 of rack support side wall 142 bounding the inner end of the indentation 148 in which the rack 134 of cam mechanism 40 is mounted. Rings 154a–154h are maintained in the illustrated configuration by bonding them to equiangularly arranged, radially extending rods 158a–158f. The outer ends of rods 158a–158f are bent downwardly to form legs 160. These legs support the flat array of rings 154a–154h in spaced relationship to the bottom wall 150 of bagel rack support 38. This allows boiling water 90 to freely circulate up through the openings 152 in the bottom 150 of the bagel rack support and into contact with the bagels 86 being boiled. The interstices in the array of rings 154a–154h allows the boiling liquid to freely reach the bagels.

As discussed above, a significant advantage of the present invention is that the same appliance 20 can be used to make the bagel dough (and other yeast doughs) as well as to boil and then bake bagels into which the dough is shaped, although this certainly is not required. Appliance 20 can equally well be employed to boil and then bake otherwise obtained, uncooked bagels such as those available in the frozen food sections of supermarkets and other stores. It was also pointed out that this additional, dough making function is provided by equipping appliance 20 with removable dough container 42, also removable dough mixing and kneading blade 44, and the electric motor-powered drive system 46 for rotating blade 44.

Dough container 42 is typically a sheet metal or plastic component with a circular section, an open top 170, a side wall 172, and a closed bottom 174.

Figure 4:
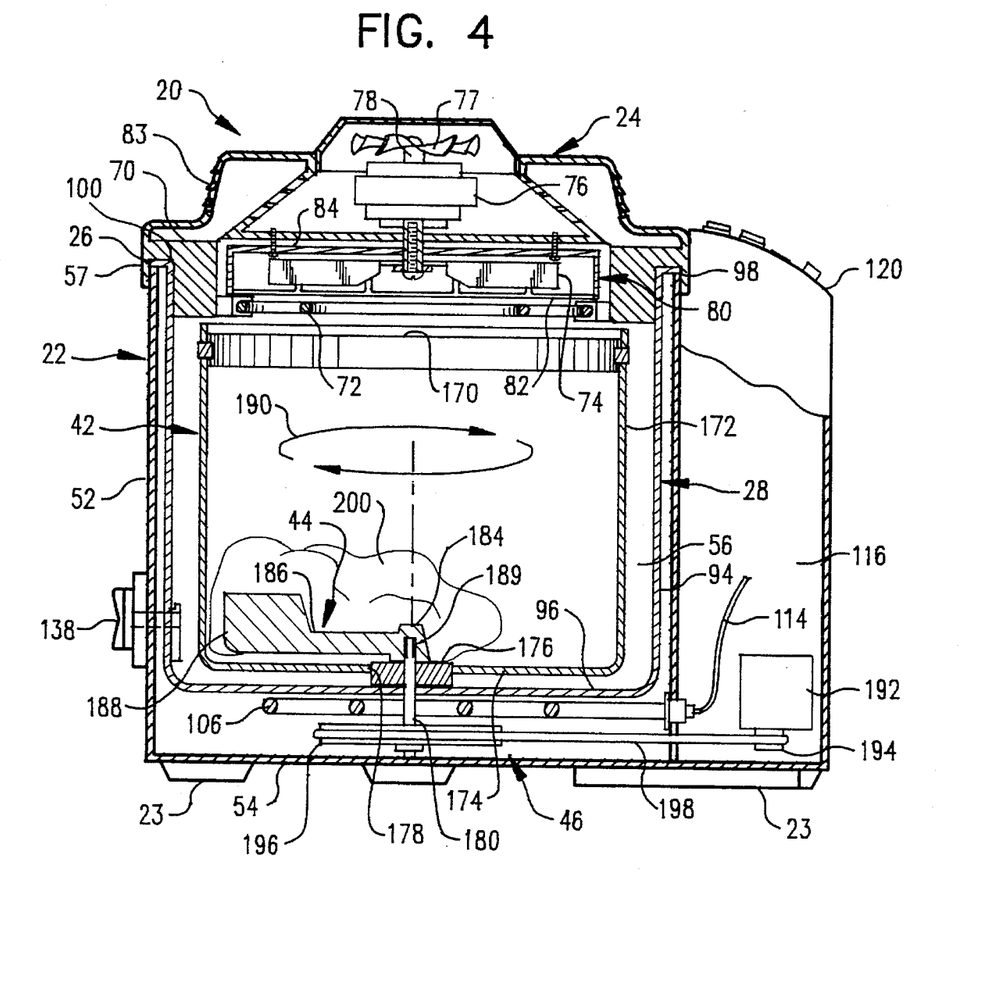
FIG. 4 is a vertical section through the appliance as used to mix and knead dough.
Figure 5:
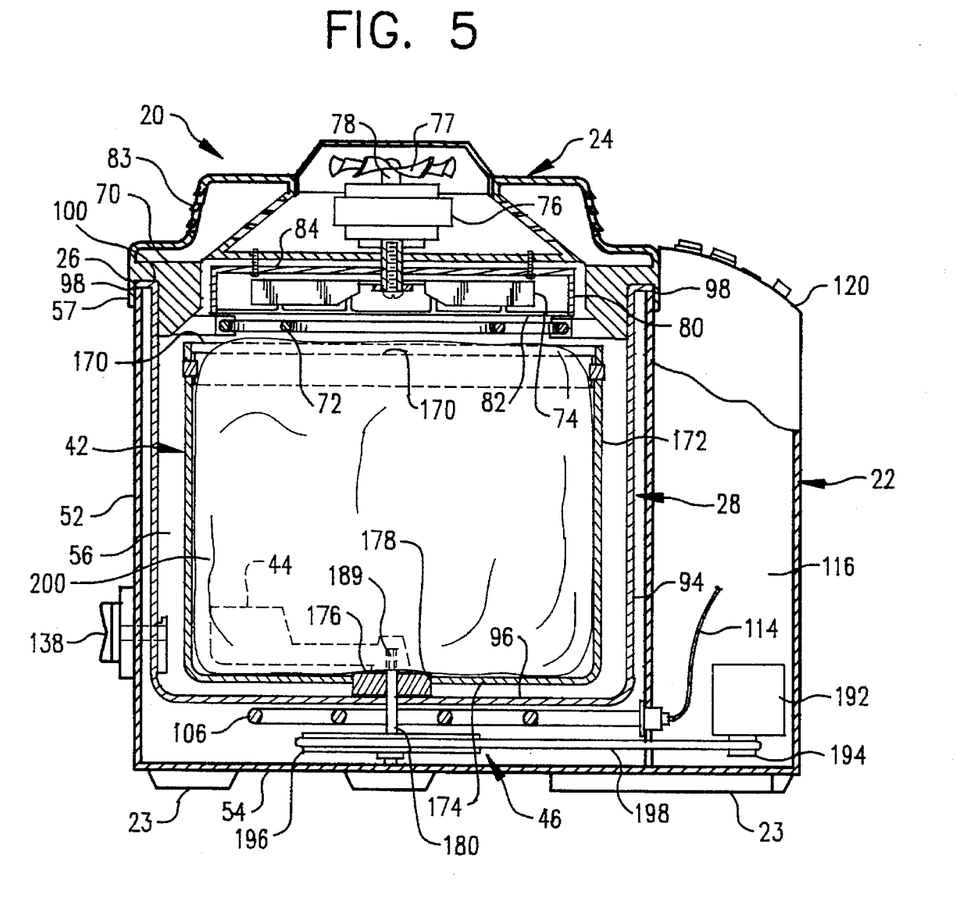
FIG. 5 is a similar section with the dough in the process of rising.

To make dough in appliance 20, bagel rack 36 and its vertically displaceable support 38 are removed; and the dough container is seated in appliance inner casing 28 (see FIGS. 2–4).

A spacer component 176 isolates the bottom 174 of dough container 42 from the bottom wall 96 of appliance inner casing 28. This keeps vibration from being transmitted to other components of appliance 20. Component 176, which is installed in a centrally located aperture 178 in dough container bottom wall 174, also serves as a bushing for the vertically oriented, driven shaft 180 of dough blade drive system 46. Driven shaft 180, which extends upwardly from a seat on the bottom wall 54 of appliance outer casing 22 into the interior 56 of appliance inner casing 28, also cooperates with vibration absorbing spacer 176 to center dough container 42 in the inner casing.

Dough mixing and kneading blade 44 (best shown in FIGS. 2–4), is of conventional construction. This component has a hub 184, an integral arm 186 extending radially from hub 184, and an also integral blade 188 at the outer end of arm 186.

After dough container 42 is installed in appliance inner container 28, blade 44 is installed by pressing its hub 184 downwardly onto the upper end of driven shaft 180. This couples internal splines in the hub (not shown) with vertically oriented, external splines 189 at the upper end of the rotatable driven shaft 180, thus drive connecting blade 44 to the driven shaft for rotation therewith as indicated by arrows 190 in FIG. 4.

In addition to the driven shaft 180 just described, the system 46 employed to rotate dough mixing and kneading blade 44 includes an electric motor 192 housed in the cavity 116 between the appliance outer and inner casings 22 and 28. The output shaft of this motor (not shown) is drive-connected to blade-rotating shaft 180 via a pulley 194 on the motor output shaft; a pulley 196 assembled to the lower end of, and rotatable with, shaft 180; and a flexible endless belt 198 extending between, and trained around, pulleys 194 and 196.

In its dough making mode, appliance 20 functions in a manner akin to that of breadmaking machines. The dough ingredients—basically water, yeast, flour, and salt and, typically, a solid or liquid fat employed as a dough enhancer and conditioner—are added to dough container 42. Next, blade 44 is rotated to first mix and then knead the bread dough ingredients. The dough 200 is then allowed to rest and rise. The dough container 42 will be removed from appliance 20 and the dough then removed from the dough container after the dough has risen. Next, the risen dough is punched to release gas built up in the dough, formed into bagel or other shapes, and set aside to rise for a second time.

Turning now to FIG. 10, the control system 48 of appliance 20 regulates the operation of: the mixing/kneading blade drive motor 192, the resistance heater 106 in the boiler zone 30 of appliance 20, and the heater 72 and fan 74 in convection oven zone 32. The control circuit includes: a two-position switch 206 for turning motor 192 on and off, a three-position switch 210, an oven zone thermostat 212, a digital timer 214 with a contact 214a in the circuit of motor 192 and a second contact 214b in the circuit of convection oven heater 72, and an indicator such as the illustrated buzzer 216.

Switch 210 has a BOIL position in which the heater 106 in the boiler zone 30 of appliance 20 is connected across AC power source 217, an OFF position, and a BAKE position in which the fan 74 in the convection oven zone 32 of appliance 20 is connected across power source 217 and the heater 72 in the oven zone is connected across the power source through thermostat 212. The thermostat has an external control 218 (see FIG. 1) for adjusting the oven zone temperature (typically between 300° and 450° F.).

Digital timer 214 is wired across AC power source 217 by power cord 217a (see also FIGS. 1–3). In addition to contacts 214a and 214b which are closed while the timer is counting down and opened when the set time lapses, that component of appliance 20 includes the customary elapsed (or remaining) time display 219 along with equally conventional START and STOP/RESET buttons 220 and 221 and a SET button 222 which can be repeatedly depressed to set a time selected by the user of appliance 20.

Buzzer 216 is connected across power source 217 through timer 214 and, as is conventional, is turned on when the set time has elapsed.

Switch 206 is used in the above-discussed dough making mode of operation of appliance 20. In the MIX position, it allows the drive motor 192 for mixing and kneading blade 44 to be turned on while timer 214 is running and contact 214a is consequently closed. In the OFF position, switch 206 keeps motor 192 from being inadvertently turned on and posing a threat of injury to an operator from the rotating mixing/kneading blade 44. SET button 222 is used to set timer 214 for the time of the mixing/kneading cycle. Buzzer 216 sounds when the cycle time has lapsed, and drive motor 192 is turned off by the opening of timer contact 214a when the set time elapses.

After the dough 200 has risen and been shaped, the uncooked bagels 86 are loaded onto bagel rack 36, and external knob 138 is rotated to lower the rack into the water 90 in the inner casing 28 of appliance 20. SET button 222 is then employed to set digital timer 214 for the period of time required to bring water 90 to the boil and to then boil the bagels for an appropriate length of time. Three-position switch 210 is then set to BOIL, and button 220 is depressed to start timer 214. When the time elapses, buzzer 216 sounds; and the user moves switch 210 to the OFF position to turn off heater 106.

Next, knob 138 is rotated to elevate bagel rack 36 and the now boiled bagels to the convection oven section 32 of appliance 20 (see FIG. 7). Then, SET button 222 and thermostat controller 218 are employed to set the baking time and temperature, switch 210 is moved to the BAKE position to condition the heating coil 72 circuit, and start switch 220 is depressed to start timer 214 for the baking cycle, closing contact 214b and turning on the convection oven heating coil 72. Buzzer 216 sounds again when the baking time elapses; and timer contact 214b opens, turning off heating coil 72. The user then moves switch 210 from the BAKE position to the OFF position to turn off convection fan motor 76, opens the cover 24 of the appliance, and employs an accessory such as the one disclosed in parent application Ser. No. 08/372,518, a pair of tongs, etc. to remove bagel rack 36 and the now baked bagels 86 from the bagel cooker.

Many modifications in the illustrated and above-discussed embodiment may of course be made without exceeding the scope of the present invention. The invention may thus be embodied in many forms without departing from the spirit or essential characteristics of the invention. The present embodiment is therefore to be considered in all respects as illustrative and not restrictive. The scope of the invention is indicated by the appended claims rather than by the foregoing description, and all changes which come within the meaning and range of equivalency of the claims are intended to be embraced therein.

I claim:

1. A bagel dough making and bagel cooking appliance which comprises:

a casing;

a boiler zone in said casing; a first heating means for boiling water in said boiling zone;

an oven zone in the casing; a second heating means in said oven zone;

a bagel support means which is installable in and removable from said casing;

a user-actuatable means for shifting said bagel support means to said boiler zone to boil bagels supported on said bagel support means and for shifting said bagel support means to the oven zone to bake the boiled bagels; and dough making means installable in and removable from said casing.

2. An appliance as defined in claim 1 which comprises:

a first heater means for said boiler zone;

a second heater means for said oven zone; and means employable by a user to independently control the operation of said first and second heater means.

3. An appliance as defined in claim 2 in which the user-employable control means comprises user-manipulatable switch means for routing electrical energy to a user-selected one of said first and second heater means, user-settable means for timing the operation of the selected heater means, and user-adjustable means for so controlling the operation of the second heater means as to regulate the temperature in said oven zone.

4. An appliance as defined in claim 3 which comprises a fan which is located in said oven zone and which is so electrically connected that the fan is operated concomitantly with said second heater means.

5. An appliance as defined in claim 3 which comprises means for signalling that the time set by a user has expired.

6. An appliance as defined in claim 3 wherein said switch means has an OFF position in which neither of said first and second heaters is energized.

7. An appliance as defined in claim 1 in which the dough making means comprises a dough container and means for mixing and kneading dough ingredients in said container.

8. An appliance as defined in claim 7 which comprises operator-accessible means for controlling the operation of said dough mixing and kneading means.

9. An appliance as defined in claim 1 which includes a bagel support means shiftable between the boiler zone and the oven zone and means for shifting the support between those zones.

10. An appliance as defined in claim 8 in which the oven zone is located above the boiler zone; and the means for shifting the bagel support means between the boiler zone and the oven zone comprises a toothed rack assembled to the bagel support means, a pinion having teeth meshing with the teeth on said rack, shaft means rotatably supporting said pinion from said casing, and means accessible from the exterior of the casing for rotating said shaft.

11. An appliance as defined in claim 1 which comprises a non-removable inner container in which said oven and boiler zones are located, said container being constructed for holding water in which said bagels can be boiled.

12. An appliance as defined in claim 11 which includes:

a first cover means cooperable with said casing to isolate the interior of the casing; and a second cover means for said water-holding inner container, said second cover means being supported from said first cover means.

13. Bagel cooking appliance as defined in claim 12 which includes a heater and a fan, both supportable from said first cover means in the oven zone of the inner container means.

14. A dough making and cooking appliance which comprises:

an external casing;

a container in which dough can be made, said container being installable in and removable from said casing;

dough mixing and kneading means installable in said dough container; and means for cooking dough placed in said appliance subsequent to the removal of said dough container and said dough mixing and kneading means from said casing, said cooking means comprising means providing a boiling zone and said boiling zone being defined by an inner casing for holding water in which dough can be boiled;

said inner casing being permanently installed in said outer casing and having a lower end; and said cooking means further comprising a boiling zone heater mounted in said external casing beneath the lower end of the inner casing.

15. An appliance as defined in claim 14 which comprises a drive means for said dough mixing and kneading means, said drive means being housed in said external casing and comprising a shaft extending upwardly through the bottom of the inner casing into the interior of said inner casing.

16. An appliance as defined in claim 15 which comprises means for controlling the operation of said drive means.

17. A dough making and cooking appliance which comprises:

an external casing;

a container in which dough can be made, said container being installable in and removable from said casing;

dough mixing and kneading means installable in said dough container; and means for cooking dough placed in said appliance subsequent to the removal of said dough container and said dough mixing and kneading means from said casing;

said appliance also comprising a second, non-removable inner casing which has first and second cooking zones and is configured to have said dough container installed therein and said cooking means comprising independently operable, first and second heating means for said first and second cooking zones and means for supporting dough in said inner casing; and said appliance further comprising means operable from the exterior of the external casing for shifting the support means between said first and second cooking zones.

18. An appliance as defined in claim 17 in which:

the first cooking zone is located in the lower reaches of the inner casing and the second cooking zone is located above the first cooking zone; and the means for shifting said support means comprises a toothed rack assembled to the support means, a pinion having teeth meshing with the teeth on said rack, shaft means rotatably supporting said pinion from said external casing, and means accessible from the exterior of the casing for rotating said shaft.

* * * * *